Dec. 18, 1962 R. G. SEYL 3,069,332
SIMPLIFICATION IN METHOD OF MEASURING CORROSION OF ELECTRONIC
CONDUCTORS BY NON-GASEOUS IONIC CONDUCTORS
Filed Oct. 22, 1959

Inventor
Robert G. Seyl
by Parker & Carter
Attorneys

United States Patent Office 3,069,332
Patented Dec. 18, 1962

3,069,332
SIMPLIFICATION IN METHOD OF MEASURING CORRISION OF ELECTRONIC CONDUCTORS BY NON-GASEOUS IONIC CONDUCTORS
Robert G. Seyl, 1123 Mulford St., Evanston, Ill.
Filed Oct. 22, 1959, Ser. No. 848,239
6 Claims. (Cl. 204—1)

This invention is directed to simplifications in the measurement of the corrosion current determining the corrosion rate of an electronic conductor corroded by a non-gaseous ionic conductor, and is a continuation-in-part of my co-pending application Serial No. 778,211, filed December 4, 1958, now abandoned, which is in turn a continuation-in-part of my co-pending application Serial No. 659,459, filed May 15, 1957, now abandoned, which is in turn a continuation-in-part of my application Serial No. 282,935, filed April 18, 1952, now abandoned, which is in turn a continuation-in-part of my application Serial No. 786,499, filed November 17, 1947, and now abandoned.

DEFINITIONS

Some terminology used in the art requires more specific definition when applied to this invention, and these definitions follow.

An electronic conductor conducts D.C. current by electron flow. Elemental metals and their alloys typify electronic conductors, but the class includes substances which do not have metallic properties, as carbon and graphite, and certain chemical compounds as oxides and sulfides.

A non-gaseous ionic conductor consists of an electrolyte dissolved in an ionizing solvent, and conducts D.C. current by the flow of positive ions in one direction and the flow of negative ions in the opposite direction. The "ionic conductor" hereinafter referred to excludes the gaseous type of ionic conductor also known to the art.

A corrosion interface is here defined as that boundary region between the surface of an electronic conductor and an ionic conductor in contact therewith, within which occur the electrochemical corrosion reactions of ion formation and discharge produced by electric current, and within which these corrosion reactions may be affected by films formed on the electronic conductor surface by physical adsorption, electrochemical migration, chemical combination, mechanical application, and other means.

The voltage existing across the interface bounding electronic and non-gaseous ionic conduction is not directly measurable. It is indirectly measured as the voltage difference between said electronic conductor and the electronic conductor of a reference electrode in electrical contact with the ionic conductor, and is termed the electrode potential, with the nature of the reference electrode also identified.

Free electrode potential is here defined as the electrode potential existing when the interface bounding electronic and non-gaseous ionic conduction is free from voltage disturbances produced by or momentarily resulting from externally produced current passed through the interface.

When a D.C. current is passed through the interface bounding electronic and non-gaseous ionic conduction, the voltage across the interface becomes altered in value and a polarized electrode potential results. Polarization voltage is here defined as the difference between the polarized electrode potential and the free electrode potential.

New terminologies essential to describing novel details of this invention are set out through the use of word capitalizations in the specification and claims which follow. bilities of these interface electrodes described and meas-

OBJECTS

The principal object of this invention is the provision of a simplified method for measuring the corrosion rate of an electronic conductor surface corroded by a non-gaseous ionic conductor.

Another object of this invention is the provision of a method of the foregoing character which simplifies measurement of the corrosion current of an electrochemical mechanism measured and described in detail in the preceding division of this invention.

Another object of this invention is a method of the foregoing character which measures with practically instantaneous speed the corrosion current that determines the corrosion rate.

A further object of this invention is a method of the foregoing character which continuously measures this corrosion current.

THE ART

This invention is directed to a simplified method for measuring the corrosion current of the interface electrode system.

In my prior method, greatest simplification in measurement of the corrosion current operating within a corrosion interface corroding at the free electrode potential requires measurement by the method of the invention of a range of current-potential relationship substantially including the free electrode potential of the corrosion interface and extending beyond the transition point occurring at minimum polarization voltage, and application of resolving operations to this measured range of current-potential relationship through previously measured characteristic values of the voltage separation between consecutive transition points and of the line slope voltage, to produce measurement of the component current-potential relationships of the interface electrode system.

In the method described herein, the requirement for measuring initial range of current-potential relationship is simplified to the requirement for a single measurement of value of polarizing D.C. current and resulting polarization voltage. The requirement for resolving operations is simplified to measurement of the corrosion current through characteristic proportionality of the interface electrode system applied to measured value of polarizing D.C. current and resulting polarization voltage.

Distinctive advantages are produced through this simplified method of corrosion current measurement. The measured value of polarizing D.C. current may be less than the value of the corrosion current being measured, to minimize disturbance of the corrosion interface properties. The corrosion current may be measured within the substantially instantaneous time lapse of about two minutes. The corrosion current may be continuously measured through the time interval within which the polarizing D.C. current does not unduly alter properties of the corrosion interface. The method may be operated through a measurement device of small size and weight, made simple to operate, with the meter measuring the polarizing D.C. current being operated to directly indicate the value of the corrosion current being measured. The method may be operated through a measurement device producing continuous recording of variation in corrosion current with passage of time.

PRELIMINARY DESCRIPTION

The method described herein is based upon an electrode system in which measurement is made of an interface electrode system characterized by interface electrodes having free electrode potentials of 0.02±0.002 volt separation and by inter-related anodic and cathodic polaraured by a line slope voltage of 0.02±0.002 volt, and found to operate through these characteristics without restriction to interface composition and conditions of operation. This interface electrode system defines an additional characteristic property of the corrosion interface, which is here termed the direct voltage, and which is equal to the sum of the anodic and cathodic polarization voltages produced on a corrosion interface by a value of anodic and cathodic polarizing D.C. current equal to the value of the corrosion current of the interface electrode system when the corrosion interface corrodes at its free electrode potential. This direct voltage occurs within the initial range of practically linear relationship between value of polarizing D.C. current passed through the corrosion interface and value of resulting polarization voltage produced across the interface. A single measurement of polarizing D.C. current and resulting polarized electrode potential made within this range, with polarization voltage measured from additional measurement of the free electrode potential of the corrosion interface, produces measurement of the corrosion current through this linearity of current-potential relationship when related to the characteristic value of the direct voltage. This measurement method, here termed the simplified method, may be operated through a selection of alternative electrode systems adaptable to laboratory and plant equipment handling corrosives.

This simplified method may be operated through the combination of a corrosion interface to be measured, a separate opposed and unmeasured interface, and a separate reference electrode.

Another combination includes a corrosion interface to be measured with a separate opposed and unmeasured interface which remains unpolarized and operates as the reference electrode.

Another combination includes a corrosion interface to be measured with a separate opposed interface duplicating electrochemically the interface to be measured and of area no smaller than said interface, which operates as a reference electrode and which may contribute to the measured resulting polarization voltage.

This simplified method may measure the corrosion current without sacrifice of accuracy in corrosion rate measurement. Maximum accuracy is obtained from the average of two consecutive measurements made with reversed polarity of the applied D.C. voltage.

THE FIGURES

The following figures originate with the preceding division of this invention, and are repeated here to describe the measuring equipment and the principles upon which the simplified method operates.

BASIS OF SIMPLIFIED METHOD OPERATION

Figure 3:
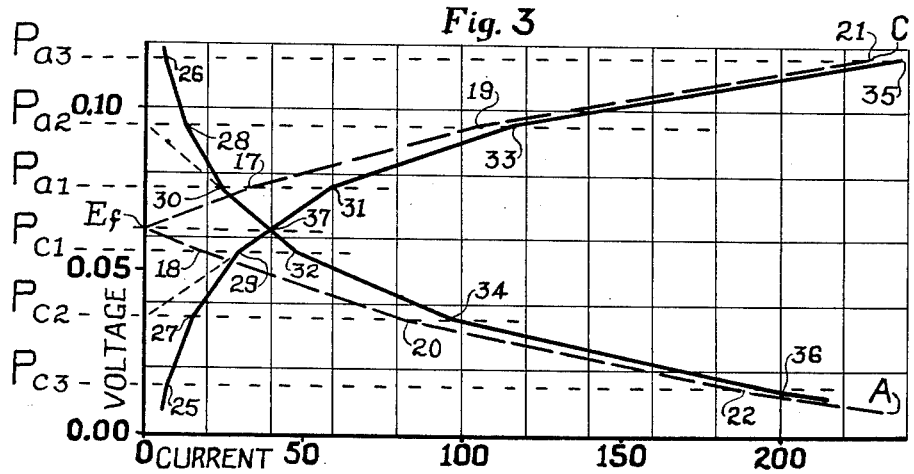
FIGURE 3 shows undistorted ranges of anodic and cathodic current-potential relationship measured by the method described in my prior method, and shows the corrosion mechanism of the interface electrode system obtained therefrom by operations of resolving also described in my prior method.
Figure 2:
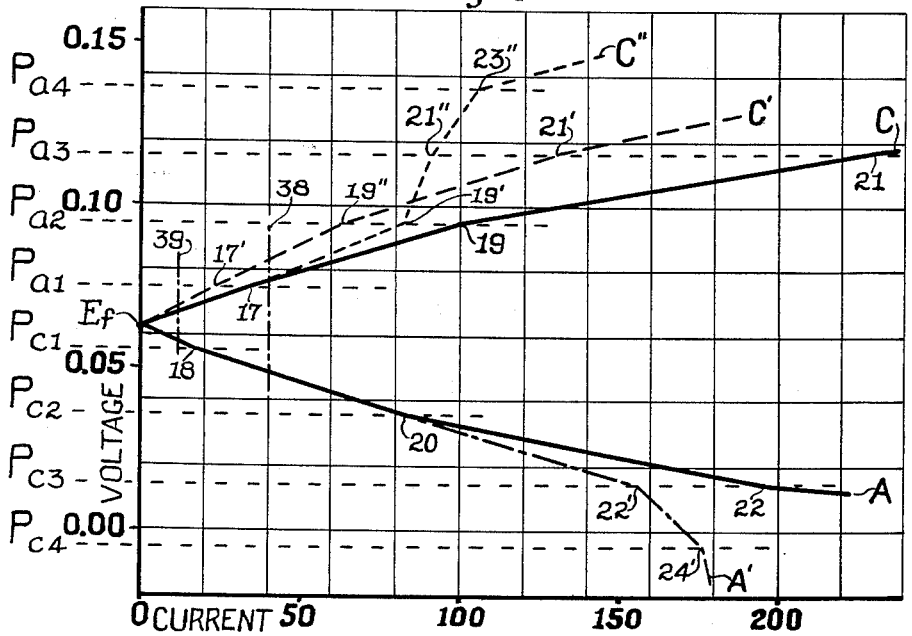
FIGURE 2 is a graph showing variations in shape of initial current-potential relationship range when measured by my prior method.

The value of the direct voltage upon which operation of the simplified method relies is determined as follows. Referring to FIGURE 3, point 37 measures a 40 unit corrosion current operating at free electrode potential $E_f$ of the corrosion interface on which undistorted current-potential relationship ranges $E_f-C$ and $E_f-A$ were measured. In FIGURE 2 a current line is extended from this 40 unit value of current to a point 38. The voltage intercepted along this current line by undistorted current-potential relationships $E_f-C$ and $E_f-A$ is equal to the sum of the anodic and cathodic polarization voltages produced by a polarizing D.C. current of 40 current units, and is shown to be 0.029 volt. This is a characteristic voltage, because the current-potential relationships of FIGURES 2 and 3 are independent of graphical dimension of voltage unit and of current unit, and are independent of the ampere value of the current unit. The characteristic 0.02±0.002 volt separation between free electrode potentials of interface electrodes and the characteristic 0.02±0.002 volt value of line slope voltage of the interface electrode system determine the value of the direct voltage independently of specific value of current unit. The 40 unit current distance on these graphs may represent 4, 40, 400, or any other microampere value of current measured on a specific corrosion interface of specific area. This direct voltage may also be defined from the extension of initial lines $E_f-17$ and $E_f-18$ of undistorted current-potential relationships $E_f-C$ and $E_f-A$, which intercept 0.031 volt along the current line at 40 current units.

Another principle upon which the simplified method operates is that only a small amount of distortion of current-potential relationship may occur within a corrosion interface of unspecified composition and operation when polarized by a value of D.C. current equal to the value of the corrosion current of the interface electrode system operating at the free electrode potential of the corrosion interface. Reference is made to FIGURE 2 which shows various shapes of distorted current-potential relationships compared with undistorted relationships of $E_f-C$ and $E_f-A$. The distorted relationships are shown in the position of coinciding transition point potentials and free electrode potential, and with current units graphically proportioned so that the corrosion current operating at the free electrode potential of the measured corrosion interface coincides with the 40 unit current value defined in FIGURE 3 by point 37. Undistorted cathodic current-potential relationship $E_f-C$ and distorted current-potential relationship $E_f-C''$ intersect the 40 unit current line at substantially the same potential. Undistorted anodic current-potential relationship $E_f-A$ and distorted relationship $E_f-A'$ also intersect the 40 unit current line at substantially the same potential. Some forms of distortion, illustrated by current-potential relationship $E_f-C'$ may occur to a small extent within the initial range of the polarizing D.C. current. Distorted relationship $E_f-C'$ and relationship $E_f-A$ intercept 0.035 volt along the 40 unit current line.

The direct voltage may consequently be regarded to range from about 0.029 to 0.035 volt, and for actual measurement purposes the average value of 0.032±0.003 volt is taken. One way of applying this direct voltage is to polarize two corrosion interfaces of electrochemically duplicated interface properties and of equal areas by that value of D.C. current producing anodic and cathodic polarization voltages of sum equal to the direct voltage. The value of this polarizing D.C. current is then equal to the value of the corrosion current operating on the corrosion interface when it corrodes at its free electrode potential.

Another principle upon which the simplified method operates is the observation that the direct voltage is defined from approximately equal values of cathodic polarization voltage and anodic polarization voltage. This is illustrated in FIGURE 2 by the showing of 0.015 volt of anodic polarization, and cathodic polarization ranging from 0.015 to 0.021 volt. The corrosion current occurring at the free electrode potential of a corrosion interface may accordingly be measured as equal to that value of polarizing D.C. current producing an anodic or cathodic polarization voltage equal to one-half of the direct voltage.

A further principle upon which the simplified method operates is that the relationship between polarizing D.C. current passed through the corrosion interface and the resulting polarization voltage produced within the range extending from zero to about 0.03 volt may be regarded as practically linear for present purposes. Referring to FIGURE 2, the extent of line slope change occurring at transition points 17 and 17' of measured cathodic current-potential relationships is relatively small. The same is true of line slope change occurring at transition point 18 of measured anodic current-potential relationship. It is not too inaccurate to view current-potential relationship between points $E_f$ and 19, $E_f$ and 19', $E_f$ and 19'', and between points $E_f$ and 20 as being linear for present purposes. Proportionalities of triangular relationship may then be applied to measure values of polarizing D.C. current and resulting polarization voltage ranging up to about 0.03 volt, as follows. The value of the corrosion current operating when the corrosion interface corrodes at its free electrode potential is related to the measured value of anodic or cathodic polarizing D.C. current passed through the corrosion interface in the proportion that one-half of the direct voltage is related to the measured value of the resulting polarization voltage produced by the polarizing D.C. current.

CURRENT-POTENTIAL RELATIONSHIP MEASUREMENT

The simplified method may be operated within a wide range of precision, from qualitative measurement to precision or quantitative measurement. Little additional effort is required to obtain high precision of measurement, and the details of producing such measurement are described below with the obvious understanding that principles employed may be applied in varying degree.

The corrosion interface to be measured is formed by contacting a single surface of electronic conductor 1 with ionic conductor 2. The separate and opposed interface required for passing the polarizing D.C. current through the interface to be measured is formed by contacting a surface of electronic conductor 3 with ionic conductor 2.

The area of the interface to be measured and the area of the separate and opposed interface are formed with a combination of regularity in shape, size, and opposed position selected to produce small range of variation in value of polarized electrode potential subsequently produced on the interface to be measured by the polarizing D.C. current passed between the two opposed interfaces. The accuracy of corrosion current measurement depends upon the extent to which the measured value of polarized electrode potential is indicative of the potential of the entire interface area. When localized corrosion occurs within the interface to be measured, the localized areas of potential dissimilarity are short-circuited through paths of ionic conduction producing small IR voltage drops measurable as a small range of variation in the free electrode potential, and the polarized electrode potential will occur with corresponding small range of variation. The uniformity in forming the paths of ionic conduction passing the polarizing D.C. current between the two opposed interfaces is limited to maintaining range of variation of voltage delivered to the measured interface within range of variation occurring to the free electrode potential.

Figure 1:
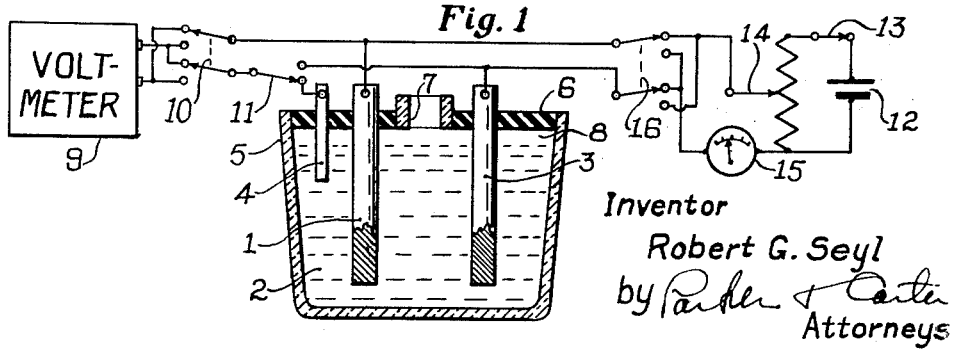
FIGURE 1 is a diagrammatic section illustrating essential components of measuring apparatus.

FIGURE 1 illustrates one combination in which the measured interface and the separate and opposed interface are formed from rod electrodes of identical dimensions, with rod diameter made small compared to rod length and with major axes placed in parallel relationship. Rod diameter is diminished with decrease of ionic conductor conductivity, and may range from about one centimeter with ionic conductors of good conductivity to about two millimeters with ionic conductors of small conductivity approaching that of distilled water. The interface area is produced primarily through selection of rod length.

The reference electrode required for electrode potential measurement is established within the ionic conductor at a separation distance from the measured interface sufficient to include total polarization voltage produced on the measured interface by the polarizing D.C. current. A separation distance of no less than about ⅛ inch has proven satisfactory, and is regarded to include mechanical and concentration polarizations. The separation distance also tends to produce an average measurement of the range of variation within which the electrode potential may occur.

The reference electrode is also positioned to substantially exclude voltage produced by ionic conductor resistance to the conduction of the polarizing D.C. current. This may be accomplished by separating the reference electrode from the measured interface by a distance no greater than about ¾ inch with ionic conductors of medium conductivity.

The corrosion current may be measured at any instant of time selected after electronic conductors 1 and 3 are placed in contact with ionic conductor 2.

The free electrode potential $E_f$ of the corrosion interface generally varies with time, and small variation in potential $E_f$ may represent a large portion of the comparatively small polarization voltage to be measured. When accurate corrosion measurement is required, a first measurement is made of the potential $E_f$ in the form of the voltage difference between the electronic conductor of the interface to be measured and the electronic conductor of the reference electrode.

A D.C. voltage of selected polarity is then applied to electronic conductors 1 and 3 through a voltage delivery system selected from a class which promptly produces approached equilibrium in the form of slow rate of change of the current-potential relationship, to polarize the interface to be measured by a voltage within the range from slightly above zero to about 0.03 volt at the time of measurement. Two classes of voltage delivery systems meeting this requirement are broadly illustrated in FIGURE 1 by battery 12, battery switch 13, potentiometer 14 and polarity reversing switch 16 as follows.

One class of voltage delivery system promptly producing approached equilibrium of current-potential relationship delivers the D.C. voltage with a definite extent of voltage regulation. Referring to FIGURE 1, when potentiometer 14 is of low resistance, the D.C. voltage initially applied to the electrodes from a selected potentiometer arm position remains substantially constant, and the current-potential relationship promptly approaches equilibrium in the form of decreasing rate of change of decreasing polarizing D.C. current. When potentiometer 14 is of intermediate resistance, the D.C. voltage initially applied to the electrodes increases and the polarizing D.C. current decreases, and the current-potential relationship promptly approaches equilibrium in the form of decreasing rate of change of increasing polarization voltage and decreasing rate of change of decreasing polarizing D.C. current. When potentiometer 14 is of high resistance, the D.C. voltage initially applied to the electrodes increases from a small value while the polarizing D.C. current may undergo little change, and the current-potential relationship promptly approaches equilibrium in the form of decreasing rate of change of increasing polarization voltage. A definite extent of voltage regulation may alternatively be produced by manual adjustments made to the potentiometer arm after application of the D.C. voltage, as through adjustments made to maintain the applied voltage constant, or as through adjustments made to maintain the polarizing D.C. current constant.

Another class of D.C. voltage delivery system produces prompt approach of the current-potential relationship toward equilibrium by continuously delivering the D.C. voltage at a substantially constant rate of change not exceeding the selected slow rate of change at which measurement is made of the polarizing D.C. current and the resulting polarized electrode potential. The arm of potentiometer 14 is driven at a selected constant speed to deliver the D.C. voltage at the selected rate of change.

A voltage delivery system may be selected from either of these classes described above, without altering the accuracy of the corrosion current measurement. The class continuously delivering the D.C. voltage at constant rate of change offers no advantage to the simplified method described herein, and has the disadvantage of limiting the time for making the measurements to the time within which the resulting polarization voltage remains within the range for measurement by the simplified method.

Measurement may be made of the value of polarizing D.C. current and resulting polarized electrode potential as soon as the current-potential relationship initially approaches a rate of change slightly greater than that produced by rate of change of the corrosion rate. The simplified method may be operated at such low density of polarizing D.C. current that rate of current-potential relationship distortion by the D.C. current generally becomes negligible. Rate of change of the corrosion rate may vary from small value with fixed ionic conductor composition and fixed corrosive environment, to larger values when measurement is made during changing ionic conductor composition or changing corrosive environment.

With a voltage delivery system of the class delivering the D.C. voltage with definite extent of voltage regulation, a convenient practice is to observe rate of current-potential relationship change during 30 second intervals through readings of D.C. current or polarized electrode potential, whichever is made most indicative by the extent of the voltage regulation. Measurement may be made of value of polarizing D.C. current and resulting polarized electrode potential as soon as the current-potential relationship has approached a constant rate of change. This constant rate of change may range from about 0.2% to 2% during the 30 second time interval, depending upon rate of change occurring to the corrosion rate.

With a voltage delivery system of the class continuously delivering the D.C. voltage at a constant rate of change, the constant rate of change in voltage delivery may range from about 0.015 volt per minute to slower rates delivered to electrodes 1 and 3 when of comparable polarability, and measurement is made of the value of polarizing D.C. current and resulting polarized electrode potential at any selected instant of time when the polarization voltage is within the measurement range of the simplified method.

With a voltage delivery system of the class delivering the D.C. voltage with definite extent of voltage regulation, measurement may be made of value of polarizing D.C. current and resulting polarized electrode potential at instants of time or continuously throughout an interval of time after initial attainment of the approached equilibrium during which change of interface composition and operation do not reduce accuracy of the corrosion current measurement below a desired limit. The length of this time interval through which measurement may be continued depends upon specific conditions of corrosion interface composition and operation, and on the electrode combinations chosen in the measurement method. Progress of the corrosion, particularly when attended by change in ionic conductor composition or corrosive environment, may produce significant change in free electrode potential when measured from a separate reference electrode 4 or an unpolarizable electrode 3 of composition different from electronic conductor 1, but may produce little if any disturbance in measurement accuracy when electrodes 1 and 3 are of identical electronic conductor composition and electrode 3 operates as the reference electrode. The continued passage of the polarizing D.C. current may produce many effects related to specific corrosion interface composition, such as the formation or breakdown of a protective film, and alteration of composition of ionic conductor layer contacting the ionic conductor surface. The length of this time interval through which measurement may be continued may in general be determined by removal of the applied D.C. voltage, by allowing the corrosion to continue for a small time interval to restore its undisturbed performance, and then by making an instantaneous measurement of the corrosion current by the simplified method. If this instantaneous measurement continues the trend of corrosion current defined in preceding measurement, it is reasonable to conclude that the accuracy in preceding measurement was not being unduly impaired.

Upon the completion of intended measurements, the applied D.C. voltage is generally removed to permit the corrosion interface to continue the corrosion at its free electrode potential.

The value of the polarization voltage is calculated from the free electrode potential and the polarized electrode potential according to details known to the art.

ALTERNATIVE INTERFACE COMBINATIONS FOR MEASUREMENT

The simplified method may be operated through various combinations applied to forming the corrosion interface to be measured, the separate and opposed interface for passing the polarizing D.C. current, and the reference electrode interface for electrode potential measurement, as follows.

In one combination, the corrosion interface area to be measured is formed with electronic conductor 1, the separate and opposed interface for passing the polarizing D.C. current is formed with electronic conductor 3, and the reference electrode interface for electrode potential measurement is formed with separate electronic conductor 4. This combination is advantageous with ionic conductors of small conductivity, through introducing negligible IR voltage from ionic D.C. current conduction into measured value of resulting polarized electrode potential by positioning electronic conductor 4 to locate electronic conductor 1 between electronic conductors 3 and 4, as is shown in FIGURE 1.

Electronic conductor 3 may be of composition other than that of electronic conductor 1, and then should not alter the properties of the corrosion interface to be measured. Corrosion products of electronic conductor 3 should not enter into replacement reaction with the substance of electronic conductor 1, or form a protective film within the electronic conductor 1 interface. The possibility of hydrogen or oxygen liberation within the electronic conductor 3 interface should not alter the corrosivity of ionic conductor 2 much more than that produced by the electronic conductor 1 interface.

Electronic conductor 4 may be in direct contact with ionic conductor 2, and then should not alter the properties of the corrosion interface to be measured. Alternatively, electronic conductor 4 may contact ionic conductor 2 through a reference electrode ionic conductor, and then means should be employed to prevent contamination of ionic conductor 2 such as jelling the reference electrode ionic conductor in a capillary tip.

Measurement is made with this combination of interfaces as follows. The free electrode potential is measured between electronic conductors 1 and 4. Voltmeter 9 is of a class requiring negligible actuation current. Switch 11 connects the voltmeter across electronic conductors 1 and 4. The reversing switch 10 may be required if voltmeter 9 measures D.C. voltage of single polarity. The D.C. current passed between electronic conductors 1 and 3 may polarize the electronic conductor 1 interface within the range from slightly above zero to about 0.03 volt. Value of polarizing D.C. current is measured by meter 15. The resulting polarized electrode potential is measured between electronic conductors 1 and 4. The corrosion current operating when the electronic conductor 1 interface corrodes at its free electrode potential is then related to the measured value of polarizing D.C. current in the ratio that ½ of the direct voltage is related to the polarization voltage calculated from the measured values of the resulting polarized electrode potential and the free electrode potential.

In another combination, the corrosion interface area to be measured is formed with electronic conductor 1, the separate and opposed interface for passing the polarizing D.C. current is formed with electronic conductor 3, and the reference electrode interface for electrode potential measurement is the electronic conductor 3 interface, in which this interface is made of composition and operation to substantially resist polarization by measured value of polarizing D.C. current, and in which the separation distance between the electronic conductor 1 interface and the electronic conductor 3 interface is limited to that introducing negligible IR voltage from ionic D.C. current conduction into measured value of resulting polarized electrode potential. This combination is advantageous when measurement is made in industrial equipment having containing walls of metal, such as pipes and tanks.

The interface formed by electronic conductor 3 may be made substantially unpolarizable by the combined factors of interface area and interface corrosion rate. When electronic conductor 3 corrodes at a rate comparable to electronic conductor 1, the polarization of the electronic conductor 3 interface may be held to about one tenth that of the electronic conductor 1 interface by forming the electronic conductor 3 interface area of size ten times greater than the electronic conductor 1 interface. Electronic conductor 1 may be in the form of rod positioned along the major axis of a pipe, with the inside pipe surface forming the electronic conductor 3 interface. The electronic conductor 3 interface may be formed by a tank wall near which electronic conductor 1 is positioned. The effective interface area formed by an electronic conductor 3 surface is generally limited by IR voltage loss through the ionic conductor to about ten times that of the electronic conductor 1 interface area. This invention shows that initial range of interface polarability is inversely related to corrosion rate, and polarization resistance may additionally be achieved through an electronic conductor 3 interface of larger corrosition rate than that of the electronic conductor 1 interface. Alternatively, electronic conductor 3 may form a reversible unpolarizable interface with a second ionic conductor, with this second ionic conductor contacting ionic conductor 2 through a non-contaminating junction.

Electrode potential measurements are made with this combination as follows. Voltmeter 9 is connected across electronic conductors 1 and 3 through switch 11. The free electrode potential and the polarized electrode potential of the electronic conductor 1 interface are measured between electronic conductors 1 and 3. The corrosion current operating when the electronic conductor 1 interface corrodes at its free electrode potential is obtained through the same relationship as that described for the preceding combination of measured interfaces.

In still another combination, the corrosion interface area to be measured is formed of area $A_1$ with electronic conductor 1, the separate and opposed interface area for passing the polarizing D.C. current is formed with electronic conductor 3 electrochemically duplicating the electronic conductor 1 interface in the form of an area $A_2$ of size no smaller than $A_1$, and the reference electrode interface for electrode potential measurement is the electronic conductor 3 interface in which the separation distance between the electronic conductor 1 interface and the electronic conductor 3 interface is limited to that introducing negligible IR voltage from ionic D.C. current conduction into measured value of resulting polarized electrode potential. This combination offers a convenient selection of electronic conductor material and produces high accuracy of measuurement when area $A_2$ is made equal to area $A_1$ to cause the simplified method to produce a measurement averaging the performances of duplicated corrosion interfaces.

The free electrode potential of the corrosion interface is measured as the potential difference between electronic conductors 1 and 3. Ordinarily this potential difference may be negligible, but in the presence of unequally distributed localized corrosion occurring within the duplicated interfaces it may exceed 0.02 volt. When the free electrode potential does not exceed the applied voltage, its effect tends to be cancelled out with two consecutive measurements made by the simplified method with reversed polarity of the applied D.C. voltage, through the averaging of the corrosion current values obtained from the two measurements.

The principles of simplified method operation remain unaltered when measurement is made with these duplicated interfaces of areas $A_1$ and $A_2$, and the details consist of handling a polarization voltage of one polarity with a polarization voltage of reversed polarity in an additive manner which is measured between electronic conductors 1 and 3, as follows. The same value of measured polarizing D.C. current passes through each of the duplicated interfaces, polarizing one anodically and the other cathodically. The polarizing D.C. current density passing through the interface of area $A_2$ is therefore less than that passing through the interface of area $A_1$ by the factor, $A_1/A_2$. Since the simplified method is operated within the substantially linear initial range of current-potential relationship, the polarization voltage produced across the interface of area $A_2$ is less than that produced across the interface of area $A_1$ by this factor, $A_1/A_2$. Consequently when the interface of area $A_1$ is polarized within a range of voltage up to about 0.03 volt, the interface of area $A_2$ is polarized by a voltage up to $(A_1/A_2)(0.03)$ volt, so that the total polarization voltage calculated from the free electrode potential and the polarized electrode potential, each measured between electronic conductors 1 and 3, may range up to $(1+A_1/A_2)(0.03)$ volt. In calculating the corrosion current, the proportionality term $(1/2)$(direct voltage) applies to the single polarity of the polarization voltage produced on the interface of the area $A_1$. Since the polarization voltage produced across the interface of area $A_2$ is included in the polarization voltage measurement, its effect must be included by increasing this proportionality term through addition of the quantity $(A_1/A_2)(1/2)$(direct voltage), so that the total proportionality term becomes $(1/2)(1+A_1/A_2)$(direct voltage). The corrosion current operating when the electronic conductor 1 interface of area $A_1$ corrodes at its free electrode potential is then related to the measured value of the polarizing D.C. current in the ratio that the term $(1/2)(1+A_1/A_2)$(direct voltage) is related to the polarization voltage calculated from the measured values of the resulting polarized electrode potential and the free electrode potential, and electrochemically duplicated interface area $A_2$ may contribute to the precision of the measurement. Thus, when area $A_2$ is of such large size that it is practically unpolarized, the direct voltage proportionality term becomes $(1/2)$(direct voltage); and when area $A_2$ is made equal to area $A_1$, the direct voltage proportionality term becomes (direct voltage), and the corrosion current is measured with the increased precision obtained from the averaged response of two duplicated and measured interfaces.

RATE MEASUREMENT BY CORROSION CURRENT

The accuracy with which this simplified method may measure the interface electrode system corrosion current occurring at the free electrode potential of the measured corrosion interface is indicated from a consideration of the basis for simplified method operation described earlier in this specification, and leads to the following generalizations.

(1) The accuracy of measuurement made on the electronic conductor 1 interface from a single value of polarizing D.C. current and resulting polarization voltage is increased by a second measurement made with reversed polarity of the applied D.C. voltage.

(2) As the measured value of the resulting polarization voltage produced on the electronic conductor 1 interface is increased beyond the voltage (1/2)(direct voltage), the value of the polarizing D.C. current tends to produce increasing distortion of corrosion interface properties occurring before starting the measurement, and thereby to reduce the accuracy of the corrosion current measurement.

(3) Measurement made with the resulting polarization voltage produced on the electronic conductor 1 interface within a range from slightly above 0 to about 0.01 volt may tend to improve accuracy through measurement made within the linear range of initial current-potential relationship extending from free electrode potential $E_f$ up to the potential of first transition point 17 or 18 of FIGURE 2, and through a minimizing of current-potential relationship distortion produced by value of polarizing D.C. current, but may also tend to reduce the precision of measuring the smaller values of polarizing D.C. current and resulting polarization voltage.

(4) When the free electrode potential $E_f$ and the resulting polarized electrode potential are measured between electronic conductors 1 and 3, correction may be made for IR voltage loss in ionic conduction of the measured value of the polarizing D.C. current by subtracting a small voltage from the polarization voltage calculated from the two electrode potential measurements. This subtraction is more conveniently accomplished in practice by increasing the ratio of the direct voltage term to the resulting polarization voltage through the addition of a voltage up to about 0.003 volt to the direct voltage.

(5) Measurement made with the electronic conductor 1 interface of area $A_1$ and the electronic conductor 3 interface of area $A_2$ electrochemically duplicating the $A_1$ interface and of area equal to the $A_1$ interface, increases accuracy through measurement of a corrosion current which averages the performances of two duplicated interfaces. A second measurement immediately following the first measurement and made with reversed polarity of the applied D.C. voltage increases accuracy through averaging two corrosion current measurements and through averaging the response of each of the two corrosion interfaces to polarizing D.C. current passed in cathodic direction and in anodic direction.

The degree of accuracy with which the simplified method is capable of measuring the interface electrode system corrosion current may not be indicated through comparison with the corrosion current of the method measuring initial range of current-potential relationship described in the preceding division of this invention. Measurement by the simplified method may be made with minimum disturbance of corrosion interface properties occurring before measurement. Measurement of initial range of current-potential relationship may slightly disturb interface properties occurring before the measurement. A difference in value of corrosion current measured by these two methods may indicate the extent of disturbance produced by measurement of initial current-potential relationship range.

The accuracy with which the interface electrode system corrosion current measured by the simplified method determines the corrosion rate cannot be directly measured, since no method other than that of the preceding division of this invention is known for measuring corrosion rate non-destructively and instantaneously. The determination must be made indirectly through comparison with a corrosion quantity-time measurement method, such as the weight loss method, through the following steps.

(1) Measurement is made of the initial weight of electronic conductor 1. When corrosion interface composition and operation include details which minimize difference in weight loss obtained with duplicated corrosion interfaces, opposed electrode 3 may duplicate electrochemically and in area the electronic conductor 1 interface and also be measured.

(2) After forming the electronic conductor 1 and 3 interfaces, a series of corrosion current measurements are made by the method of this invention throughout the progress of the corrosion. A corrosion current-time graph is made with a curve drawn through each measured point of corrosion current and time. The trend of this curve aids in defining the frequency and number of corrosion current measurements required.

(3) The corrosion current-time curve is integrated to a corrosion quantity-time curve through application of Faraday's law of electrolysis, with anodic electrochemical reaction assumed to produce metal ions of valence equal to that found in the corrosion product. This corrosion quantity-time curve continuously predicts weighable metal loss.

(4) The corrosion is continued through a duration producing metal loss weighable within about ±5% precision, since this is generally the limit of precision within which metal loss occurs on duplicated electrodes.

(5) When metal loss of selected quantity is measured by the corrosion quantity-time curve, the electronic conductors are removed from the corrosive and are immediately cleaned, dried, and subsequently weighed. The series of corrosion current measurements made at spaced time intervals by the method of this invention when operated through duplicated interfaces $A_1$ and $A_2$ of equal area, generally measures quantity of metal loss of value between the two quantities of metal loss weighed on the duplicated electrodes. When the weighed quantity of metal loss on duplicated corrosion interfaces is not in close agreement, a corrosion quantity-time curve may be measured separately on each electronic conductor interface by the method of this invention.

With certain interface compositions and conditions of operation, it is sometimes found that the valence of metal ions produced in the anodic electrochemical reaction by the corrosion current of the interface electrode system is different from the valence of the metal ions found in the corrosion product, particularly in the presence of dissolved oxygen. When this occurs, it is found that the corrosion quantity-time curve may be related to the corrosion current-time curve through a simple and exact mathematical expression, which adds classification detail to anodic corrosion mechanism. This is taken as evidence that purely chemical corrosion reaction may sometimes follow after the initiating anodic electrochemical reaction to modify the corrosion products of the electrochemical reaction.

The non-destructive instantaneous corrosion current measurement by the method of this invention permits measurement of the effect of a corrosion variable operating to change the corrosion rate of the corrosion interface while the value of the corrosion variable is changed in a selected manner through a selected range. The corrosion variable may pertain to ionic conductor composition, as inhibitor concentration, pH value, salt concentration, or other variables. The corrosion variable may pertain to corrosive environment, as temperature, flow rate, or other variables. Detailed information is thus obtained with a minimum of time and effort before weighable quantity of metal loss may occur.

The preceding portion of the specification describes the basis for operation of the simplified method, the method details of measuring value of the polarizing D.C. current and resulting polarization voltage, and alternative interface combinations through which the method may be applied. The principal purpose of the examples which follow is to cite specific evidence of the scope and accuracy of the corrosion rate measurement.

Example 1.—Separate Reference Electrode, Continuous Voltage Delivery

The main purpose of this example is to illustrate measurement of the corrosion current made with a separate reference electrode 4, with the D.C. voltage delivered continuously at a small constant rate of change, and to illustrate the accuracy of measurement indicated through correlation with weighed metal loss.

Electronic conductor 1 was steel sheet in the form of a strip 1.0 centimeter wide and 2.5 centimeter long, with both faces and three edges exposed. Electronic conductor 3 was a duplication of electronic conductor 1. Electrode surfaces were polished with #300 emery paper, and each electronic conductor was weighed. An electrical lead wire was soldered to a tab portion of each electronic conductor, and the wire and tab were mounted in a glass tube and sealed with wax. Major axes of the electrodes were vertically positioned at 1 inch separation with faces of the electrodes in a common plane, permissible with the high conductivity of the ionic conductor.

The ionic conductor was 1-normal sulphuric acid made up with distilled water. It was initially deaerated by heating to boiling temperature under a layer of white mineral oil, then cooled to room temperature and partially protected from atmospheric oxygen during the corrosion by a ¼ inch layer of the oil. The electrode surfaces were lightly scrubbed with wet pumice powder to produce surfaces free from "water-break," and then lowered into the ionic conductor through the oil layer. The film of water on the electrode surfaces avoided adhesion of the oil.

The corrosive environment included complete submersion of electrode surfaces, no flow of ionic conductor, maintained deaeration, and temperature of 22° C.

A saturated calomel reference electrode 4 of noncontaminating junction was positioned about ¼ inch from electrode 1, and located so that electrode 1 was between electrodes 4 and 3. Free electrode potential $E_f$ was measured just before applying the D.C. voltage.

The voltage delivery system consisted of a potentiometer and center-tapped resistor each connected across the battery. The arm of the potentiometer was driven at constant speed. The voltage applied to the electronic conductors was taken from between the center-tap of the resistor and the arm of the potentiometer.

This voltage delivery system was adjusted to initially apply D.C. voltage to electronic conductors 1 and 3 of more than 0.02 volt. The voltage was then delivered at the substantially constant rate of change of about 0.007 volt per minute which decreased the applied D.C. voltage to zero and then increased it in reversed polarity. Measurement was made of the polarizing D.C. current $i_p$, and the resulting polarized electrode potential $e_m$, at an instant of time during the cathodic polarization of the electronic conductor 1 interface and also at an instant of time during the anodic polarization. These measurements were made at 6.0, 35.5, and 59.0 hours after starting the corrosion. The corrosion was terminated at 60.0 hours. Throughout this duration the electrodes remained in undisturbed contact with the ionic conductor.

The data of the measurements is summarized in Table I which follows. The polarization voltage $e_p$ was calculated as the positive voltage different between potentials $e_m$ and $E_f$. The corrosion current $i_m$ was then related to the polarizing D.C. current $i_p$ in the ratio that (½) (direct voltage), taken as 0.016 volt, was related to the polarization voltage $e_p$. The values of $i_m$ obtained with cathodic polarization and with anodic polarization are shown in Table I, with the average value of $i_m$ calculated from them.

TABLE I.—DATA SUMMARIZING CORROSION CURRENT MEASUREMENT OF A SINGLE CORROSION INTERFACE

| Time of Measurement, Hours | Polarization Polarity | Volts | | | Microamperes | | |
|---|---|---|---|---|---|---|---|
| | | $e_m$ | $E_f$ | $e_p$ | $i_p$ | $i_m$ | Average $i_m$ |
| 6.0 | Cathodic | 0.504 | 0.492 | 0.012 | 120 | 160 | |
| | Anodic | 0.482 | 0.492 | 0.010 | 100 | 160 | 160 |
| 35.5 | Cathodic | 0.508 | 0.495 | 0.013 | 230 | 284 | |
| | Anodic | 0.486 | 0.495 | 0.009 | 410 | 730 | 507 |
| 59.0 | Cathodic | 0.506 | 0.495 | 0.011 | 320 | 465 | |
| | Anodic | 0.486 | 0.495 | 0.009 | 360 | 640 | 553 |

The average value of the corrosion current measured at each of these three time intervals spaced throughout the duration of the corrosion was graphed to a linear current axis and a linear time axis. A smooth curve was drawn through the three points and indicated rapid increase of corrosion rate during the first 40 hours, with a constant rate being approached near 60 hours. The corrosion current was regarded to operate through the anodic electrochemical reaction, $Fe = Fe^{2+} + 2(-)$, so that application of Faraday's law of electrolysis produced calculation of the factor, 0.0104 milligram loss of iron per microampere per ten hours of corrosion. Integration of the corrosion current-time curve with this calculated factor produced a graphed corrosion quantity-time relationship of increasing slope, which predicted a 25.8 milligram iron loss at 60.0 hours.

The corrosion was terminated at 60.0 hours by removal of the electronic conductors, and their surfaces were immediately rinsed and dried. The electrodes were removed from the electrode assemblies, the soldered connection was removed wtih the solder, and each electrode was weighed. Weighted metal losses were 23.0±0.5 and 24.0±0.5 milligram. The predicted metal loss of 25.8 mg. is 8% above the 24.0 mg. loss measured by weighing.

Example 2.—Duplicated Interfaces $A_1$ and $A_2$ of Equal Area

The main purpose of this example is to illustrate detailed measurement of the corrosion current-time relationship by a plurality of corrosion current measurements spaced at intervals throughout the total duration of the corrosion, and the accuracy obtainable with duplicated interfaces $A_1$ and $A_2$ of equal area.

Measurement was made of the same electronic conductors, ionic conductor, and environment described in Example 1. Electronic conductor 1 formed the measured interface of area $A_1$, and electronic conductor 3 formed the opposed interface of area $A_2$ duplicating $A_1$ in electrochemical properties and physical area, and operating as the reference electrode with the 1 inch separation between the major axis of the electronic conductors introducing negligible IR voltage loss with the high conductivity of the ionic conductor. Electrode 4 was not required. Voltmeter 9 was connected across electronic conductors 1 and 3 by switch 11.

Free electrode potential $E_f$ was measured between electronic conductors 1 and 3, and found to be negligible, or substantially equal to zero with the deaerated ionic conductor. Polarized electrode potential $e_m$, measurable between electronic conductors 1 and 3, then equaled the polarization voltage $e_p$ of anodic and cathodic polarizations produced on the duplicated interfaces by the same polarizing D.C. current $i_p$.

At instants of time selected throughout the total duration of the corrosion, measurement of corrosion current $i_m$, was made as follows. The D.C. voltage applied to electronic conductors 1 and 3 was delivered through a low resistance potentiometer. The voltage delivery system was adjusted to polarize the measured interface at the time of measurement within the range of total polarization voltage $e_p$, extending up to $$(0.03)(1+A_1/A_2)=0.06$$

volt. Measurement was made of polarizing D.C. current $i_p$, and resulting polarization voltage $e_p$, upon the initial attainment of approached equilibrium in the form of substantially no change in current $i_p$ first occurring through a 20 second time interval. This required a time lapse of about 2 minutes after the D.C. voltage application. The applied D.C. voltage was then reversed by switch 16, and measurement #2 was made of voltage $e_p$ and current $i_p$. Since $e_p$ was maintained constant with the #1 and #2 measurements, an averaged $i_p$ value was calculated from the two measured values. The corrosion current $i_m$, was then related to the polarizing D.C. current $i_p$, in the ratio that the term $(1/2)(1+A_1/A_2)$ (direct voltage) was related to the polarization voltage $e_p$. The direct voltage was taken as 0.031 volt. The measurements are summarized in Table II which follows.

TABLE II.—DATA SUMMARIZING CORROSION CURRENT MEASUREMENT OF DUPLICATED INTERFACES OF EQUAL AREA

| Measurement Number | Time of Measurement, Hours | $e_p$, Volt | $i_p$, Microamperes | | | Corrosion Current, $i_m$ |
|---|---|---|---|---|---|---|
| | | | #1 | #2 | Average | |
| 1 | 0.08 | 0.024 | 140 | 180 | 160 | 206 |
| 2 | 0.25 | 0.024 | 170 | 92 | 131 | 169 |
| 3 | 0.50 | 0.024 | 200 | 140 | 170 | 219 |
| 4 | 1.0 | 0.024 | 190 | 170 | 180 | 232 |
| 5 | 1.5 | 0.024 | 200 | 170 | 185 | 238 |
| 6 | 2.0 | 0.024 | 190 | 170 | 180 | 232 |
| 7 | 3.0 | 0.024 | 180 | 150 | 165 | 213 |
| 8 | 4.0 | 0.024 | 160 | 160 | 160 | 206 |
| 9 | 7.0 | 0.024 | 220 | 210 | 215 | 277 |
| 10 | 34.8 | 0.024 | 280 | 280 | 280 | 362 |
| 11 | 36.0 | 0.024 | 320 | 320 | 320 | 413 |
| 12 | 58.5 | 0.040 | 710 | 680 | 696 | 538 |
| 13 | 59.5 | 0.040 | 760 | 720 | 740 | 574 |

The effect of regarding Free Electrode Potential $E_f$ as negligible is shown in Table II by relatively large differences between the #1 and #2 values of polarizing D.C. current $i_p$, measured during the first three hours of the corrosion. It can be shown that this effect of small $E_f$ voltage is cancelled out by averaging the #1 and #2 measurements of current $i_p$ obtained with reversal of applied D.C. voltage polarity.

The data of Table II was graphed to a linear current axis and a linear time axis. Measurement number one, in which the #1 value of current $i_p$ was measured during the first three to five minutes after immersing the electronic conductors in the ionic conductor, illustrates the ability to measure corrosion current as soon as the corrosion interface is formed. The closely spaced measurements made during the first four hours define regular curvature, and illustrate the detail with which measurement may be made of initial changes occurring to the metal surface and to the corrosive layer contacting it. These simplified method measurements were also directed to measuring the corrosion current operating before and after each of three corrosion current measurements made by measuring range of current-potential relationship defining the first two transition points on each side of the free electrode potential, as described in my prior method. Each of these current-potential relationship range measurements required a time lapse of about 14 minutes. At six hours, the transition points measured a 220 microampere corrosion current, and the simplified method measurements in Table II show that the effect was to increase the corrosion current from 206 microamperes before the measurement to 277 microamperes after the measurement. At 35.5 hours, the transition points measured a 410 microampere current, and Table II shows that the corrosion current was increased from 362 to 413 microamperes. At 59.0 hours, the transition points measured a 550 microampere corrosion current, and Table II shows that corrosion current was increased from 538 to 574 microamperes. In graphing the Table II data, measurements made at 7.0 and 34.8 hours were connected by a smooth curve, and measurements made at 36.0 and 59.5 hours were connected by a smooth curve.

The graphed corrosion current-time relationship was integrated to a corrosion quantity-time relationship which predicted a metal loss of 23.9 milligrams at 60.0 hours. This falls between the values of 23.0±0.5 and 24.0±0.5 milligrams obtained by weighings made after termination of the corrosion at 60.0 hours.

*Example 3.—Substantially Unpolarized Interface $A_2$*

It is generally known that certain combinations of corrosive composition and corrosive environment may produce a condition of unstable corrosion resistance upon a metal surface, with the result that weight losses measured on duplicated surfaces are not in close agreement. One purpose of this example is to illustrate that the method of this invention accurately measures the different metal loss which occurs to each of two duplicated electrodes. Another purpose is to illustrate measurement made with electronic conductor 1 opposed by electronic conductor 3 in the form of the inside surface of a cylinder.

Electronic conductor 1 was duplicated in the form of electrodes A and B, each of pure tin sheet of 0.8 cm. thickness, 6.0 cm. length, and 1.0 cm. width. The exposed surface of each electrode comprised both faces and three edges. The initial weight of each was measured. An electrical lead wire was attached to a tab portion of each electrode and insulated from the ionic conductor. Opposed electronic conductor 3 was in the form of the inside surface of a pure tin foil cylinder of 4.0 cm. diameter and 10 cm. length, with a tab portion for making electrical connection above the ionic conductor.

The corrosive consisted of 900 cc. distilled water, 9.0 g. pure potassium chloride, and 2.0 cc. pure acetic acid. It was contained in a glass beaker as a volume of 12 cm. depth, and was exposed to the atmosphere at room temperature of 70° F.

The tin foil cylinder was mounted in the corrosive with the major axis of the cylinder in a vertical position and with the ends of the cylinder equally spaced from the bottom and top of the corrosive. The two duplicated electrodes were mounted inside the cylinder, with their major axes in a vertical position and separated by 1.5 cm. spacing, with the ends of the electrodes equally spaced from the ends of the cylinder.

Corrosion current was measured by the simplified method at a selected instant of time during the progress of the corrosion as follows. The free electrode potential of electrode A was measured as zero from the cylinder electrode by connecting one terminal of a resistor of about one ohm to one of these two electrodes, selecting a polarity of equalizing D.C. voltage to be applied across the resistor in opposition to the polarity of the unequalized free electrode potential difference between the two electrodes, and applying this equalizing D.C. voltage in value adjusted to produce zero voltage difference between the other terminal of the resistor and the other electrode. The D.C. voltage of the simplified method was then applied to this other resistor terminal and this other electrode through a voltage delivery system maintaining the applied D.C. voltage constant. Measurement was made of the polarizing D.C. current $i_p$, and the resulting polarization voltage $e_p$, in the form of the applied D.C. voltage, when substantially no change in D.C. current $i_p$, first occurred over a 20 second interval after D.C. voltage application. The D.C. voltage of the simplified method was then applied in reversed polarity and a #2 measurement was made of polarizing D.C. current $i_p$. The equalizing D.C. voltage and the measuring D.C. voltage were then removed. In the same manner, #1 and #2 measurements were then made between electrode B and the cylinder electrode. The applied D.C. voltage, equal to resulting polarization voltage $e_p$, was 0.01445 volt. The area ratio was calculated from the electrode dimensions as, $A_1/A_2 = (2)(L)(W)/(\text{pi})(D)(H)$
$= (2)(6.0)(1.0)/(3.14)(4.0)(10.0) = 0.1$ A voltage of 0.003 volt was added to the 0.032 volt value of the direct voltage to correct for IR voltage loss in the ionic conduction of the polarizing D.C. current, $i_p$. The corrosion current $i_m$ was then related to the polarizing D.C. current $i_p$, in the ratio that the term $(1/2)(1+A_1/A_2)$ (direct voltage)

was related to the resulting polarization voltage $e_p$.

A series of corrosion current measurements were made in this manner at time intervals spaced throughout the duration of the corrosion. Table III which follows, summarizes the measurements and shows the averaged value of the two corrosion current measurements made on each electrode.

TABLE III.—DATA SUMMARIZING CORROSION CURRENT MEASUREMENT WITH SUBSTANTIALLY UNPOLARIZED OPPOSED INTERFACE

| Measurement number | Time of measurement, hours | Corrosion current $i_m$, microamperes | | | | | |
|---|---|---|---|---|---|---|---|
| | | A and cylinder | | | B and cylinder | | |
| | | #1 | #2 | Average | #1 | #2 | Average |
| 1 | 0.25 | 126 | 293 | 210 | 80 | 275 | 178 |
| 2 | 0.75 | 89 | 245 | 167 | 80 | 245 | 164 |
| 3 | 2.5 | 56 | 284 | 170 | 80 | 174 | 118 |
| 4 | 4.5 | 62 | 199 | 131 | 56 | 156 | 105 |
| 5 | 8.5 | 62 | 210 | 126 | 48 | 130 | 89 |
| 6 | 19.7 | 83 | 137 | 110 | 53 | 108 | 81 |
| 7 | 32.5 | 153 | 124 | 139 | 105 | 75 | 89 |
| 8 | 41.5 | 136 | 108 | 122 | 76 | 74 | 75 |
| 9 | 50.0 | 138 | 126 | 132 | 110 | 89 | 100 |
| 10 | 56.5 | 128 | 129 | 129 | 103 | 96 | 100 |
| 11 | 66.3 | 142 | 124 | 133 | 85 | 106 | 96 |
| 12 | 71.5 | 138 | 124 | 129 | 113 | 108 | 111 |
| 13 | 72.0 | 128 | 119 | 114 | 97 | 94 | 96 |
| 14 | 72.5 | 122 | 117 | 120 | 106 | 96 | 101 |

This data was graphed to produce two corrosion current-time relationships. These were integrated to two corrosion quantity-time relationships according to the anodic reaction, $Sn = Sn^{2+} + 2(-)$, through the factor, 0.021 milligram per microampere per 10 hours calculated from Faraday's law of electrolysis, and predicted metal losses at 73 hours of corrosion as $A = 20.6$ mg., and $B = 14.9$ mg.

At 73.0 hours the corrosion was terminated by removal of electrodes A and B from the corrosive, followed by the rinsing, wiping, and drying of their surfaces. The surfaces showed scattered severe pitting, with etched surface of about 90% and unetched surface of about 10%, further confirming corrosion system instability. Measured weight losses were, $A = 23.0 \pm 0.5$ mg., and $B = 13.0 \pm 0.5$ mg.

The simplified method measurement made on electrode A differed from the weighed metal loss by the percentage $(100)(20.5-23)/(23) = -10\%$, and the measurement made on electrode B differed from weighed metal loss by the percentage $(100)(14.9-13)/(13) = +9\%$. The graphs made from the simplified method measurements continuously related corrosion performance with time. The weighed metal losses showed only what had happened up to the time when the electrodes were removed from the ionic conductor for weighing.

*Example 4.—Anodic Reaction Measurement*

The main purpose of this example is to illustrate electrochemical corrosion reaction operating at a valence differing from the valence of the metal in the corrosion product.

Duplicated electronic conductors of pure aluminum were corroded by 0.5-normal sulphuric acid at room temperature, and the initial trend of the corrosion current-time relationship was measured by the simplified method of this invention. Sodium chloride was then added in quantity producing 0.1-N concentration and the trend of the greatly accelerated corrosion current-time relationship was measured. In view of the corrosion products, $Al_2(SO_4)_3$ and $AlCl_3$, the graphed current-time relationship was integrated to the corrosion quantity-time relationship according to the anodic reaction, $Al = Al^{3+} + 3(-)$, and predicted a 16.6 milligram metal loss. Metal losses of 18 and 20 milligrams were measured by weighing. The low value of the predicted metal loss suggested the possibility that the anodic reaction, $Al = Al^{1+} + 1(-)$, might occur in the chloride-free sulphuric acid, to be followed by dependent chemical reaction producing $Al^{3+}$ ions. Integration according to this hypothesis predicted an 18.4 milligram metal loss. Evidence confirming this hypothesis was obtained by corroding duplicated aluminum electrodes in 1-normal sulphuric acid without sodium chloride addition. Measurement by the method of this invention predicted a 22.3 milligram metal loss according to $Al^{1+}$ formation in anodic electrochemical reaction, which agreed with a $23.0 \pm 0.5$ milligram metal loss obtained by weighing.

ALTERNATIVES

The simplified method of this invention is found to produce accurate corrosion rate measurement throughout wide range of variation made in electronic conductor composition, ionic conductor composition, physical factors of corrosion environment, and duration of the corrosion, and confirms the characteristics of the interface electrode system described and measured in my prior method. The possibility is nevertheless recognized that an exceptional corrosion interface might be encountered in practice, having characteristic voltage separation between consecutive transition points and characteristic line slope voltage differing from those defining the direct voltage as $0.032 \pm 0.003$ volt. The method of this invention would remain applicable to such an exceptional corrosion interface through the value of the direct voltage defined from interface electrode system measurement by the method of my prior method.

The method of this invention is described in the detail which includes the requirements for obtaining maximum accuracy of corrosion current measurement, but it is not restricted to high accuracy and may be applied to produce qualitative measurements. The method of this invention is regarded to be applied regardless of the accuracy with which it is operated.

I claim:

1. The method of measuring a plurality of individual values of the corrosion current existing at different times within an interface in a corrosion cell to thereby obtain an indication of the different corrosion rate existing at each particular time, including the steps of establishing within a non-gaseous ionic conductor two duplicated electrodes forming interfaces of substantially equal area, applying a D.C. voltage $e_p$, between the electronic conductors of said interfaces of value selected from within the range from slightly above zero to 0.040 volt for each different measurement of the corrosion current at each different time, continuing the application of said voltage for that period of time required to initially produce the same selected small rate of change in value of current for each different measurement of the corrosion current, and measuring the current $i_p$ at the end of said period of time for each particular measurement of the corrosion current, and immediately thereafter discontinuing the voltage for that particular measurement, whereby in each particular measurement the corrosion current $i_c$ at the free electrode potential, becomes measured from the relationship, $i_c = (E_d/e_p)(i_p)$, where $E_d$ is a constant value of voltage selected from within the range of 0.029 to 0.035 volt.

2. The method of measuring current in a corrosion cell indicative of corrosion current at the free electrode potential of an electrode including the steps of establishing within a non-gaseous ionic conductor two duplicated electrodes forming interfaces of regular shape and contour, applying a direct current voltage selected within the range of slightly above zero to about .040 volt to the electrodes, measuring the current passed through the interfaces when the current is substantially equal to the current value existing when substantially no change in current first occurs over a small time interval following application of voltage and before any visible change appears in the interfaces following application of said voltage, and measuring the voltage at the time of current measurement, whereby the current measured is proportional to the corrosion current by the proportion of the measured voltage to a voltage within the range of .029 to .035 volt.

3. The method of measuring current in a corrosion cell indicative of corrosion current at the free electrode potential of an electrode including the steps of establishing within a non-gaseous ionic conductor two duplicated electrodes forming interfaces of regular shape and contour, applying a direct current voltage selected within the range of slightly above zero to about .040 volt to the electrodes, measuring the current passed through the interfaces when the current is substantially equal to the current value existing when substantially no change in current first occurs over a time interval of approximately twenty to thirty seconds following application of voltage and before any visible change appears in the interfaces following application of said voltage, and measuring the voltage at the time of the current measurement, whereby the current measured is proportional to the corrosion current by the proportion of the measured voltage to a voltage within the range of .029 to .035 volt.

4. The method of measuring current in a corrosion cell indicative of corrosion current at the free electrode potential of an electrode including the steps of establishing within a non-gaseous ionic conductor two duplicated electrodes forming interfaces of regular shape and contour, applying a direct current voltage selected within the range of slightly above zero to about .040 volt to the electrodes, measuring the current passed through the interfaces when the current is substantially equal to the current value existing when substantially no change in current first occurs over a small time interval following application of voltage and before any visible change appears in the interfaces following application of said voltage, whereby the current measured is proportional to the corrosion current by the proportion of the measured voltage to a voltage within the range of .029 to .035 volt, measuring the voltage at the time of the current measurement and immediately thereafter reversing the polarity of the applied voltage and again taking a current reading under the same condition aforementioned thereby to obtain an average value of corrosion current.

5. The method of measuring current in a corrosion cell indicative of corosion current at the free electrode potential of an electrode including the steps of establishing within a non-gaseous ionic conductor two duplicated electrodes forming interfaces of regular shape and contour, applying a direct current voltage such as to produce a total polarization voltage in the range of from slightly above zero to about .040 volt at the time of subsequent measurement to the electrodes, and measuring the current passed through the interfaces and total polarization voltage when substantially no change in the current-potential relationship first occurs following application of the voltage and before any visible change appears in the interfaces following application of said voltage, whereby the current measured is proportional to the corrosion current by the proportion of the measured voltage to a voltage within the range of .029 to .035 volt.

6. The method of measuring current in a corrosion cell indicative of corrosion current at the free electrode potential of an electrode including the steps of establishing within a non-gaseous ionic conductor two electrodes forming duplicated interfaces of regular shape and contour and of areas $A_1$ and $A_2$, where $A_2$ is not less than $A_1$, applying a direct current voltage selected within the range of slightly above zero to about $1/2(.04)(1+A_1/A_2)$ volts to the electrodes, measuring the current passed through the interfaces when the current is substantially equal to the current value existing when substantially no change in current first occurs over a small time interval following application of voltage and before any visible change appears in the interfaces following application of said voltage, and measuring the voltage at the time of current measurement, whereby the current measured is proportional to the corrosion current by the proportion of the measured voltage to a voltage within the range of $1/2(.029)(1+A_1/A_2)$ to $1/2(.035)(1+A_1/A_2)$ volts.

References Cited in the file of this patent

Blum et al.: Transaction of the American Electrochemical Society, vol. 52, 1927, pages 403–429.

UNITED STATES PATENT OFFICE
CERTIFICATE OF CORRECTION

Patent No. 3,069,332

December 18, 1962

Robert G. Seyl

It is hereby certified that error appears in the above numbered patent requiring correction and that the said Letters Patent should read as corrected below.

Column 1, line 21, after "doned." insert the following as a new paragraph:

The present application deals with a simplification of a method described and claimed in my co-pending application Serial No. 840,266 filed on September 16, 1959, which method, of that application, is hereinafter referred to as my prior method.

same column 1, line 69, beginning with "New terminologies" strike out all to and including "described and meas-" in line 72, same column 1; column 2, line 72, after "polara-" insert -- bilities of these interface electrodes described and meas- --; column 9, line 29, after "of" insert -- a --.

Signed and sealed this 26th day of May 1964.

(SEAL)
Attest:

ERNEST W. SWIDER
Attesting Officer

EDWARD J. BRENNER
Commissioner of Patents